(12) United States Patent
Fuchs et al.

(10) Patent No.: US 7,708,884 B2
(45) Date of Patent: May 4, 2010

(54) PROCESS FOR AEROBIC-THERMOPHILIC STABILIZATION AND DISINFECTION OF SLUDGE

(76) Inventors: Leonhard Fuchs, Stocktal 2, Mayen (DE) 56727; Martin Fuchs, Stocktal 2, Mayen (DE) 56727

( * ) Notice: Subject to any disclaimer, the term of this patent is extended or adjusted under 35 U.S.C. 154(b) by 0 days.

(21) Appl. No.: 10/586,222

(22) PCT Filed: Apr. 21, 2006

(86) PCT No.: PCT/EP2006/061725
§ 371 (c)(1),
(2), (4) Date: Oct. 4, 2006

(87) PCT Pub. No.: WO2006/111571
PCT Pub. Date: Oct. 26, 2006

(65) Prior Publication Data
US 2008/0245729 A1    Oct. 9, 2008

(30) Foreign Application Priority Data
Apr. 22, 2005    (DE) .................. 10 2005 018 893

(51) Int. Cl.
*C02F 3/00* (2006.01)
(52) U.S. Cl. .................. 210/603; 210/612; 210/613; 210/620; 210/631
(58) Field of Classification Search .......... 210/603, 210/609, 612–613, 620, 631
See application file for complete search history.

(56) References Cited

U.S. PATENT DOCUMENTS

| | | | | |
|---|---|---|---|---|
| 4,846,965 A * | 7/1989 | Clifft et al. .......... | 210/96.1 |
| 5,948,261 A | 9/1999 | Pressley .............. | 210/609 |
| 6,660,164 B1 * | 12/2003 | Stover ................. | 210/612 |
| 6,966,983 B1 * | 11/2005 | McWhirter et al. ..... | 210/150 |
| 2002/0079266 A1 * | 6/2002 | Ainsworth et al. .... | 210/603 |
| 2008/0073266 A1 * | 3/2008 | McWhirter et al. ..... | 210/605 |

FOREIGN PATENT DOCUMENTS

| | | |
|---|---|---|
| DE | 2852545 | 3/1980 |
| DE | 2852544 | 6/1980 |
| DE | 3240009 | 5/1984 |
| DE | 3905228 | 10/1990 |
| EP | 0384612 | 8/1990 |
| GB | 2105318 | 3/1983 |

OTHER PUBLICATIONS

International Search Report and Written Opinion dated Aug. 4, 2006 based on PCT application No. PCT/EP2006/061725.
Moeller et al. "*Entseuchung von Klaerschlamm*," Jahrgang 35, pp. 71-74.
Breitenbuecher et al. "*Aerob-Thermophile Stabilisierung von Abwasserschlaemmen*," Jahrgang 29, pp. 203-207.

* cited by examiner

*Primary Examiner*—Chester T Barry
(74) *Attorney, Agent, or Firm*—Ohlandt, Greeley, Ruggiero & Perle, LLP

(57) ABSTRACT

A process for the stabilization and disinfection of sludge wherein
a) raw sludge having a dry matter content of from 3 to 7% by weight is fed continuously or quasi-continuously into a first stage, where it remains for an average retention time of three to ten days under aerobic-thermophilic conditions to obtain a partially stabilized sludge; and
b) the partially stabilized sludge is fed into a second stage in which disinfection of the partially stabilized sludge is effected at temperatures of at least 50° C., wherein prior to discharging, there is no charging until the partially stabilized sludge has been disinfected.

14 Claims, 3 Drawing Sheets

PROCESS FOR AEROBIC-THERMOPHILIC STABILIZATION AND DISINFECTION OF SLUDGE

The present invention relates to a process and device for the aerobic-thermophilic stabilization and disinfection of thickened sludge in several steps.

A generic process has been described, for example, in "Korrespondenz Abwasser", 29th year, issue April 1982, pp. 203-207. In this process, the entering raw sludge, after having been gravity-thickened, is aerated with simultaneous intense mixing in two heat-insulated reactors connected in series. In reactor I, the temperature variation is predominantly around the upper mesophilic range ($30°$ C.$\leq$t$<42°$ C.), whereas in reactor II thermophilic temperatures ($\geq 42°$ C.) are permanently maintained. With sufficient retention time of each batch in reactor II and maintenance of the temperatures above $50°$ C., disinfection is achieved. In this plant, a batch of stabilized and disinfected sludge is discharged from reactor II once daily, followed by transferring a corresponding batch from reactor I to reactor II and finally filling reactor I with raw sludge. This operation is required to ensure disinfection in reactor II and has been regular practice to date.

Drawbacks of this process are the high variations of temperature, oxygen demand and in some cases pH-value in reactor I and the temporarily occurring odor emissions, since 30 to 50% of the reactor contents are usually replaced by raw sludge at once when the tank (reactor) is charged. For larger plants with three tanks, these problems can even aggravate.

DE-PS 28 52 544 discloses a process for the stabilization and large disinfection of sewage sludge obtained from waste water treatment plants in a temperature range of above $40°$ C., in which the sewage sludge is charged into an arrangement of one or more heat-insulated tanks, circulated by a controlled supply with atmospheric oxygen and thereby degraded exothermally. The process was characterized in that the supply with atmospheric oxygen should be feedback-controlled to maintain an almost constant sludge temperature. This process was unsuitable since the degradation of cold sludge cannot be accelerated significantly by increasing the supply with atmospheric oxygen. Reduction of the supply with atmospheric oxygen at high temperatures in the sludge leads to an unsatisfactory stabilization.

DE-AS-28 52 545 discloses a process for the stabilization and large disinfection of sewage sludge obtained from waste water treatment plants in a temperature range of above $40°$ C., in which the sewage sludge is fed into an arrangement of one or more heat-insulated tanks, circulated by a controlled supply with atmospheric oxygen and thereby degraded exothermally. The process was supposed to be characterized in that the filling volume of the tank arrangement would be varied if the feed or the composition of the sewage sludge varied. Thus, it should be achieved that the average retention time of the sewage sludge in the tanks is almost constant irrespective of the feed. This process could not eliminate the difficulties either which arise from the high peak loads in the discontinuous feeding of the first stage of multiple-stage plants for the aerobic-thermophilic stabilization and disinfection of sewage sludge.

Therefore, it is the object of the invention to develop a process and a device for the stabilization and disinfection of sludge which overcome the drawbacks of the prior art.

This object is achieved by a process for the stabilization and disinfection of sludge wherein
a) raw sludge having a dry matter content of from 3 to 7% by weight is fed continuously or quasi-continuously into a first stage, where it remains for an average retention time of three to ten days under aerobic-thermophilic conditions to obtain a partially stabilized sludge;
b) said partially stabilized sludge is fed into a second stage in which disinfection of the partially stabilized sludge is effected at temperatures of at least $50°$ C., wherein prior to discharge, there is no charging until said partially stabilized sludge has been disinfected.

In contrast to the prior art, the raw sludge is fed continuously or quasi-continuously, so that the composition does not change in the first stage, or only slightly so. This avoids the disadvantageously high variations of parameters such as temperature, oxygen demand or pH-value and reduces odor emissions, in particular.

In the disinfection step, a continuous or quasi-continuous operation is not possible since a minimum retention time, resp. minimum isolated reaction time for disinfection must be ensured. The necessary time (minimum time) for disinfection of the sludge depends on the temperature in the second stage. According to the second working report of the ATV/VKS Working Group "Entseuchung von Klärschlamm" in "Korrespondenz Abwasser", Volume 35, Issue January 1988, pages 71 to 74, a minimum time of 23 hours is required at temperatures of $50°$ C., a minimum time of 10 hours is required at temperatures of $55°$ C., and a minimum time of four hours is required at temperatures of $60°$ C. These minimum times as a function of the temperatures are to be observed as lower limits. According to a working paper of the European Union on the topic "Sludges" (third draft) of Apr. 27, 2000, a minimum time of 20 hours at a temperature of at least $55°$ C. is demanded for disinfection. These data are consistent with the values demanded by the American Environmental Protection Agency. Corresponding minimum times for disinfection are preferred. With continuous feeding, disinfection would not be possible. The respective newly fed, non-disinfected sludge would re-inoculate the sludge.

In the first stage, at least partial stabilization of the sludge is achieved. The stabilization and disinfection are then completed in the second stage, also in the thermophilic range.

A sludge is considered stabilized if it can be stored for an extended period of time or be used on agricultural land without problems. This condition is typically achieved if the organic content is reduced by about 30 to 50%, preferably more than 40%. The organic content is determined by the loss on ignition of a dried sample according to DIN 38409.

While in the prior art the temperatures in the first tank usually vary about the upper mesophilic range, temperatures in the thermophilic range, i.e., of at least $42°$ C., are reached in the first stage according to the invention. Preferably, the temperatures in this stage are at least $45°$ C., more preferably at least $48°$ C. and most preferably above $50°$ C.

In a particularly preferred embodiment, the sludge is fed continuously into the first stage. However, the feeding may also be effected intermittently. Preferably, raw sludge is fed at least once per hour. At least, the sludge should be fed more frequently than every 20 hours, more preferably at least every 12 hours, and even more preferably at least every 6 hours. The time intervals depend on the amount of raw sludge obtained and the necessary retention times in the first stage to achieve the intended partial stabilization. For example, if the average retention time in the first stage is five days and feeding is effected at intervals of 6 hours, only one 20th, i.e., 5% of the total contents, must be exchanged each time, so that disturbing variations in the composition in the first stage are substantially avoided.

Apart from regular feeding, it is also possible to couple feeding to working times, for example, to feed the plant hourly or two-hourly during the working time between 7 a.m. and 8 p.m. and not to perform feeding between 8 p.m. and 7 a.m. hours.

The stages are preferably agitated to achieve mixing of newly added raw sludge with already partially treated sludge. In addition, an oxygen-containing gas is typically introduced at least in the first stage. As in the prior art plants, the aeration intensity, aeration time and/or oxygen content of the gas supplied is controlled. Typical measured and controlled quantities for the oxygen supply are the amount of raw sludge, the redox potential or oxygen content in the sludge, and the oxygen content or $CO_2$ content of the exhaust gas.

Typically, the retention time in the first stage is three to ten days, more preferably four to seven days. In the second stage, the retention times are typically from one to three days.

It is required that the temperature for disinfection in the second stage is within a range of from 50 to 65° C., preferably from 55 to 60° C. This may be controlled by heating or cooling. The heat withdrawn may be used for heating nearby buildings, for example.

The process is performed in several heat-insulated, preferably mixed tanks with supply of oxygen-containing gas, it is safe and uniform, stabilizes well and disinfects perfectly, avoids offensive smells and is comparable with previous processes with respect to costs.

In accordance with this application, a tank is any suitable container, i.e. a basin. Such tanks are also referred to as reactors.

The invention also relates to a device for the aerobic-thermophilic stabilization and disinfection of sludge.

The device according to the invention has a raw sludge tank for the continuous and/or quasi-continuous feeding of raw sludge, which constitutes a first stage. Further, the device has a disinfection tank for disinfecting the sewage sludge partially stabilized in the first stage, which forms a second stage. Between the two tanks, there is a conveying means, which comprises pumps and valves, in particular, for the batchwise conveying of sewage sludge from the raw sludge tank into the disinfection tank. The device according to the invention is suitable, in particular, for performing the above described process.

A preferred embodiment of the device according to the invention has an intermediate tank between the raw sludge tank and the disinfection tank. The intermediate tank is connected with both the raw sludge tank and the disinfection tank. In this preferred embodiment, the conveying means is divided in two, so that a first conveying means is provided between the raw sludge tank and the intermediate tank for the (quasi-)continuous conveying of raw sludge into the intermediate tank, and a second conveying means is provided between the intermediate tank and the disinfection tank for the batchwise conveying of sewage sludge.

The providing of at least one intermediate tank has the advantage that the contents in the raw sludge tank are subjected to small variations only.

In a further preferred embodiment of the invention, at least two disinfection tanks are provided in addition to the raw sludge tank which constitutes the first stage. The disinfection tanks are in turn connected with the raw sludge tank. In the connection, especially a pipeline system, a conveying means is again provided. In this embodiment, one closing means is provided for each disinfection tank. Thus, it is possible to close one disinfection tank and open the other. Then, sewage sludge is continuously or quasi-continuously transferred from the raw sludge tank into the opened disinfection tank. As soon as one disinfection tank is completely filled, it is closed, and sewage sludge is continuously or quasi-continuously conveyed from the raw sludge tank into the second or a further disinfection tank.

It is also possible that several tanks are used in one or more of the stages, and less tanks in other stages. In this case, the tank sizes are to be chosen to match the desired procedure. For example, there may be two first tanks, from which the sludge is transferred, for example, into an intermediate tank from which the sludge is then transferred into a disinfection tank.

In the following, the invention is further illustrated by means of preferred embodiments with reference to the drawings wherein.

Figure 1:
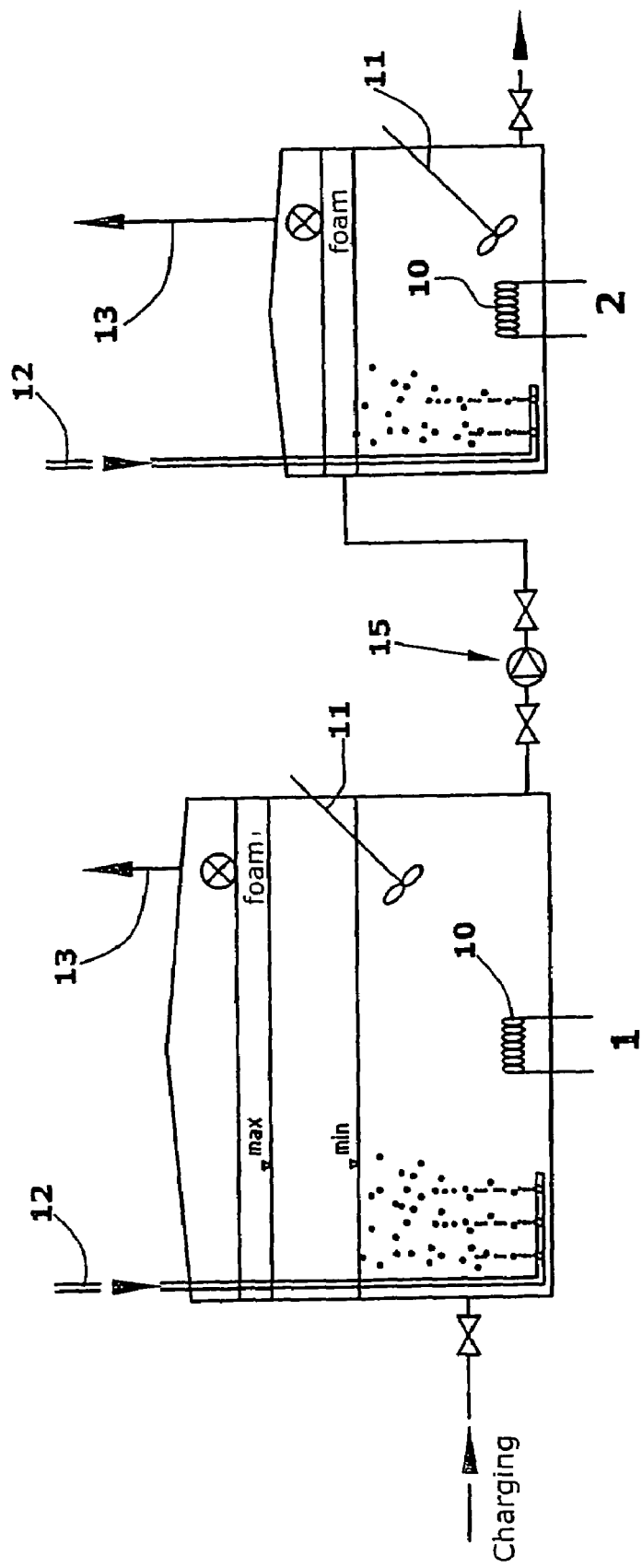
FIG. 1 shows a schematic view of a first preferred embodiment of the device according to the invention.

FIG. 1 shows a particularly simple type of design. The raw sludge tank 1 with stage 1 is fed continuously or quasi-continuously. The raw sludge tank 1 is filled thereby between minimum and maximum levels. Via the aeration device 12, oxygen-containing gas is supplied, and exhaust gas is removed via an exhaust device 13. In stage 1, mixing may also be effected by means of agitation device 11. Heating or cooling is achieved by heat-exchanger 10.

From stage 1, partially stabilized sludge is transferred into a disinfection tank 2 with stage 2, in which a heat exchanger 10, an agitation device 11, an aeration device 12 and an exhaust device 13 may also be provided. Due to the discharge from stage 1 effected by the conveying means 15, the sludge level in the raw sludge tank 1 decreases to the minimum value again. In stage 2, disinfection is then performed during the minimum isolated reaction time. Subsequently, part of the material is discharged from stage 2 and transferred to further processing.

Figure 2:
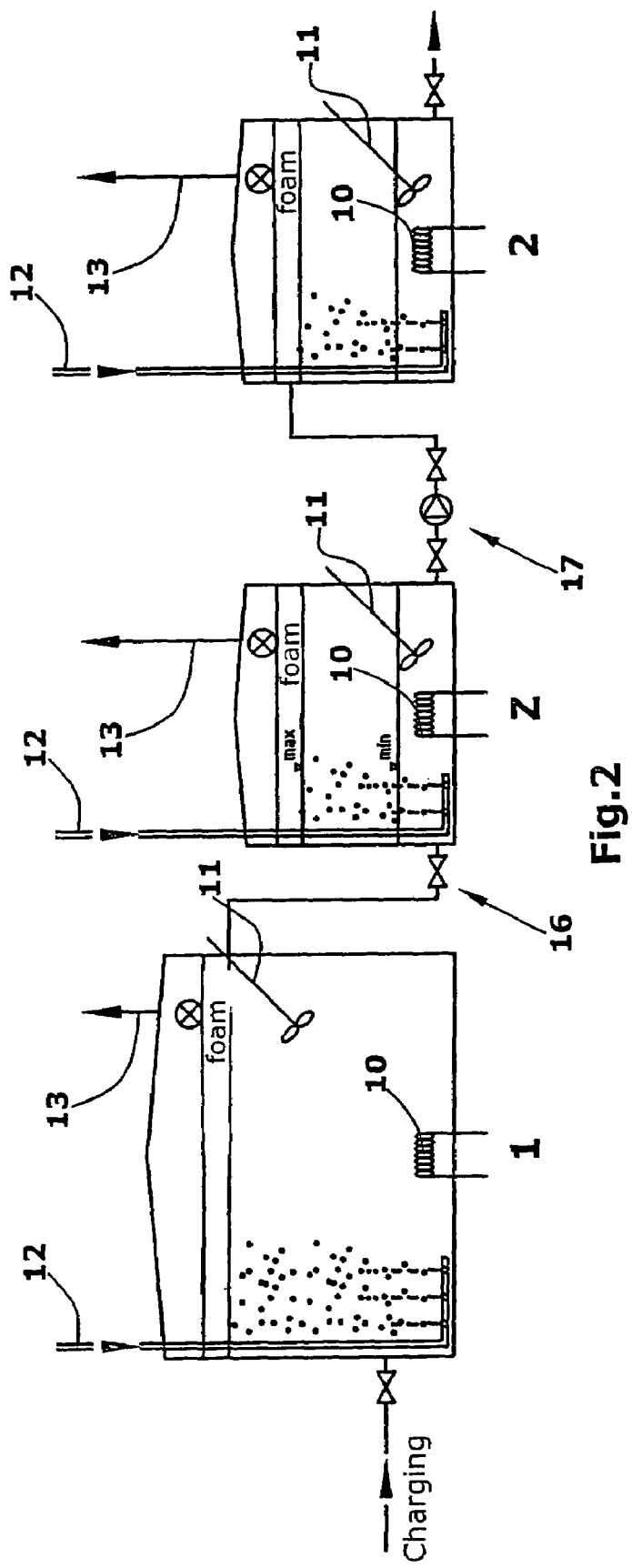
FIG. 2 shows a schematic view of a second preferred embodiment of the device according to the invention.

In larger plants, it is appropriate to provide an intermediate tank or intermediate storage tank Z as represented in FIG. 2. Raw sludge is continuously or quasi-continuously fed in stage 1 to achieve partial stabilization. In this stage, a heat exchanger 10, an agitation device 11, an aeration device 12 and an exhaust device 13 may be provided. Discharge of partially stabilized sludge by a first conveying means 16 and transfer to the intermediate storage tank Z is effected continuously or quasi-continuously depending on the feed. Due to the continuous or quasi-continuous discharge from stage 1, the intermediate storage tank Z is gradually filled. The intermediate storage tank Z may also include a heat exchanger 10, an agitation device 11, an aeration device 12 and an exhaust device 13.

Transfer from the intermediate storage tank Z into the disinfection tank 2 with stage 2, which functions as described above for FIG. 1, is then performed batchwise by a second conveying means 17.

It is advantageous that the feeding of stage 1 may be performed continuously without essential variations to the filling level. The average retention time in the intermediate storage tank Z is preferably 0.5 to 1.5 days.

The conveying means 16 may be a valve, so that gravity is used for conveying. In addition to the valve, a pump may be provided, wherein a valve is preferably inserted accordingly upstream and downstream from the pump second conveying means 17.

Figure 3:
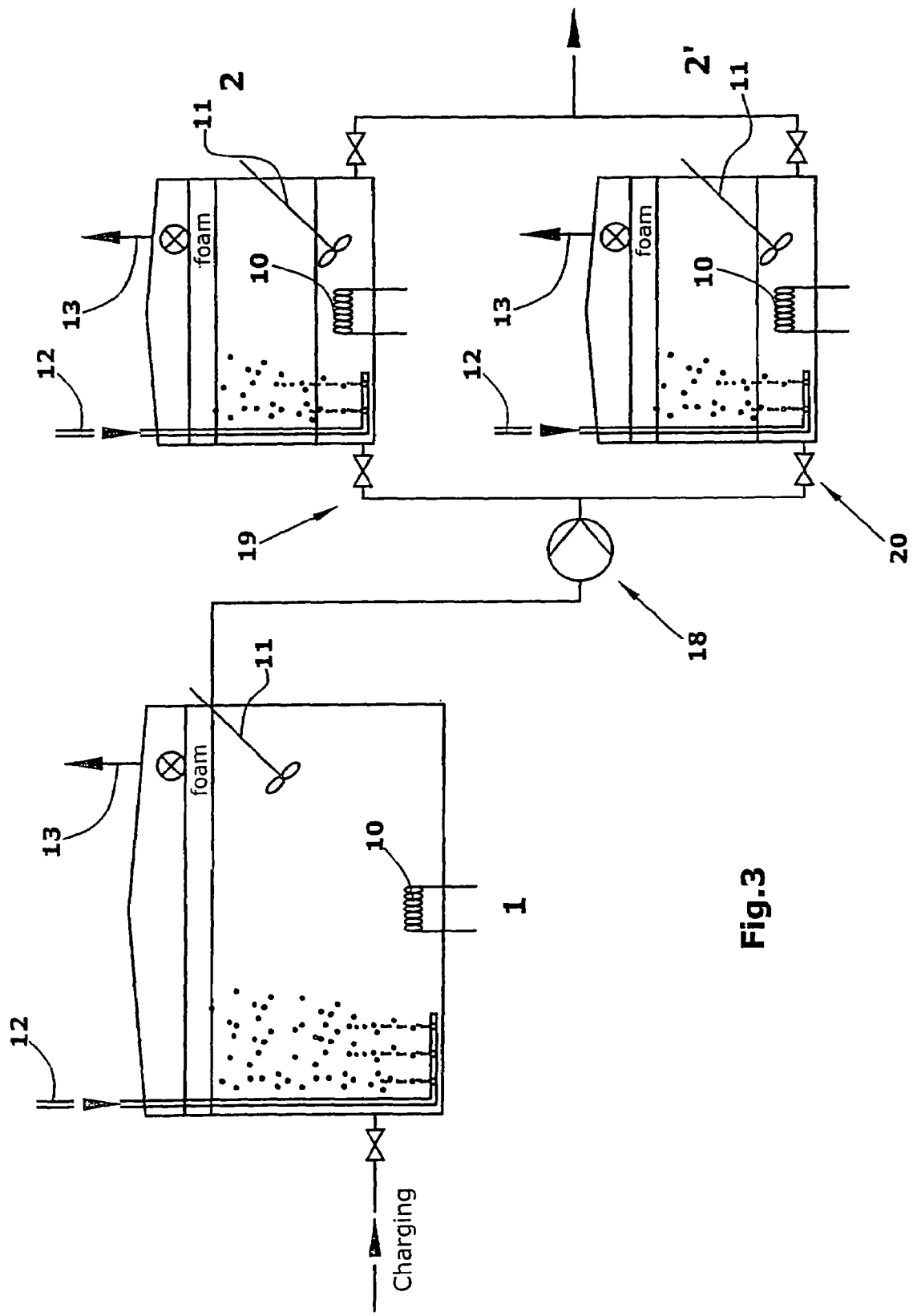
FIG. 3 shows a schematic view of a third preferred embodiment of the device according to the invention.

A particularly preferred embodiment is shown in FIG. 3. In this case too, stage 1 is fed continuously or quasi-continuously as described above. What may be provided is a heat exchanger 10, an agitation device 11, an aeration device 12 and an exhaust device 13. This is followed by two stages 2 and 2' which are operated alternately as intermediate storage tank and disinfection tank. At first, partially stabilized sludge from stage 1 is transferred with a conveying means 18, upstream from which a valve (not shown) may be inserted, into the disinfection tank 2, which may optionally have a heat exchanger 10, an agitation device 11, an aeration device 12 and an exhaust device 13. The feeding of this tank is also effected continuously or quasi-continuously. After this tank has reached a maximum filling level, the disinfection tank 2 is closed by closing means 19 and not filled further, and the continuously discharged sludge from stage 1 is transferred into the disinfection tank 2'. Thus, the closing means 20 is opened. The disinfection tank 2' may also have a heat exchanger 10, an agitation device 11, an aeration device 12 and an exhaust device 13.

Disinfection now takes place in disinfection tank 2, i.e., no further charging is performed during the minimum isolated reaction time. Subsequently, the disinfected sludge is wholly or partially discharged from the disinfection tank 2. During this time, the disinfection tank 2' is filled continuously or quasi-continuously. After the disinfected sludge has been discharged from the disinfection tank 2, the sludge discharged from stage 1 is again transferred into disinfection tank 2, and disinfection is effected in disinfection tank 2'.

Instead of an agitation device 11 and an aeration device 12, a device which combines the functions of agitation and aeration or aeration, agitation and foam-control in itself may also be provided.

The heat exchangers in the different stages serve for increasing or decreasing temperatures in individual stages in order to obtain the desired process values.

Depending on the kind of sludge and its content of aerobic-thermophilically degradable organic matter, the average retention time in the whole plant is between five and twelve days, and in a range of seven to nine days for usual municipal sewage sludges.

The process according to the invention is for the treatment of thickened sludge as obtained from the mechanical and/or biological treatment of domestic and/or industrial sewage, in particular, and a dray matter content (DS) of from 3 to 7%, preferably from 4 to 6%, is achieved by gravity or mechanically. Such thickened sewage sludges generally contain sufficient organic matter for the exothermic aerobic-thermophilic degradation in stage 1.

Their rheological properties are such that they are easy to handle. Especially, if a preheating of the thickened raw sludge or a heating of stage A is to be avoided, a dry matter content (DS) of the raw sludge of about 4 to 5% is recommendable. Then, within the predetermined retention time of preferably four to eight days, enough heat is released in the first stage to reach the desired thermophilic temperatures autothermally.

The supply of oxygen may be controlled by the aeration intensity, aeration time and/or oxygen content of the gas supplied. The controlling is optionally effected in accordance with the content of aerobic-thermophilically degradable organic matter, the redox potential or oxygen content in the sludge, and the oxygen content or $CO_2$ content in the exhaust gas.

Useful tanks include all agitated and aerated reactors as used in waste water and sludge technology, which may preferably be equipped with means for foam control. The supply and withdrawal of heat is effected by usual heat exchangers. Undesirable heat losses are avoided by a sufficient insulation of the tanks.

The process according to the invention may be applied not only to the aerobic-thermophilic stabilization and disinfection of sewage sludge, but also to liquid manure and other organic concentrates, such as waste from yeast production and food wastes. It has been found that the process according to the invention stabilizes reliably and well and disinfects safely without causing offensive smells. A biological further treatment in the mesophilic temperature range, i.e., at about 20 to 40° C., is possible.

Exhaust gas released from the process may also be recovered and treated physically, chemically and/or biologically.

The aerobic-thermophilically stabilized and disinfected sewage sludge is preferably used in liquid form on agricultural land. Of course, humification or dewatering is also possible.

What is claimed is:

1. A process for the stabilization and disinfection of sludge wherein
   raw sludge having a dry matter content of from 3 to 7% by weight is fed continuously or quasi-continuously into a first stage, during which it remains for an average retention time of three to ten days under aerobic-thermophilic conditions to obtain a partially stabilized sludge, and wherein if the raw sludge is fed quasi-continuously the time between two chargings of the first stage is not longer than 12 hours; and
   said partially stabilized sludge is fed into a second stage during which disinfection of the partially stabilized sludge is effected at temperatures of at least 50° C., wherein prior to discharging, there is no charging until said partially stabilized sludge has been disinfected.

2. The process according to claim 1, wherein said partially stabilized sludge from the first stage is continuously or quasi-continuously fed into an intermediate storage tank, from which it is fed batchwise to the second stage.

3. The process according to claim 1, wherein the average retention time in the second stage is at least two days.

4. The process according to claim 1, wherein the sludge is agitated in the first and/or second stages.

5. The process according to claim 1, wherein the time between two chargings of the first stage is not longer than 6 hours.

6. The process according to claim 1, wherein no charging is effected for at least four hours.

7. The process according to claim 1, wherein the amount of oxygen supplied in the first or second stage is controlled depending on parameters selected from the group of:
   charged amount of raw sludge;
   redox potential in the sludge;
   oxygen content in the sludge;
   oxygen content in the exhaust gas; and
   $CO_2$ content in the exhaust gas.

8. The process according to claim 1, wherein the temperature in the second stage is within a range of from 50 to 65° C. and is controlled by supplying or withdrawing heat.

9. The process according to claim 1, wherein the aerobically stabilized and disinfected sludge is subsequently further treated physically, chemically and/or biologically.

10. The process according to claim 1, wherein exhaust gas released in the process is recovered and treated physically, chemically and/or biologically.

11. The process according to claim 1, wherein a device is used for the aerobic-thermophilic stabilization and disinfection of sludge comprising:
   a raw sludge tank for the continuous or quasi-continuous charging of raw sludge, which is for the first stage;

a disinfection tank for disinfecting the partially stabilized sewage sludge, which is for the second stage; and a conveying means provided between the raw sludge tank and the disinfection tank for the batchwise conveying of sludge into the disinfection tank.

12. The process according to claim 11, further comprising an intermediate tank provided between the raw sludge tank and the disinfection tank and connected with both tanks, a first conveyor for the continuous or quasi-continuous conveying of partially stabilized sludge from the raw sludge tank into the intermediate tank, and a second conveyor for conveying sludge from the intermediate tank into the disinfection tank.

13. The process according to claim 11, comprising at least two disinfection tanks connected with the raw sludge tank, wherein one closing means is provided for each disinfection tank, so that at least one of the disinfection tanks can be closed while at least one other disinfection tank is open for being continuously or quasi-continuously filled.

14. The process according to claim 11, wherein said raw sludge tank, disinfection tank and/or intermediate tank have an agitation device and/or an aeration device and/or an exhaust device and/or a heat exchanger.

* * * * *